July 11, 1933. E. C. WALTER 1,917,476

FULL CYCLE LOCATING MECHANISM

Filed Dec. 14, 1932

INVENTOR
Edward C. Walter
BY
Stuart Wilder ATTORNEY

Patented July 11, 1933

1,917,476

UNITED STATES PATENT OFFICE

EDWARD C. WALTER, OF ORANGE, NEW JERSEY, ASSIGNOR TO MONROE CALCULATING MACHINE COMPANY, OF ORANGE, NEW JERSEY, A CORPORATION OF DELAWARE

FULL CYCLE LOCATING MECHANISM

Application filed December 14, 1932. Serial No. 647,119.

The invention has relation to means for locating a rotary mechanism in full cycle position upon release of said mechanism from a motor drive, and it is shown as applied to calculating machine control devices such as those disclosed in U. S. Patent 1,544,806, issued to George C. Chase, July 7, 1925.

The invention consists in the novel construction and combination of parts as set forth in the appended claims.

In the accompanying drawing, illustrating the invention:

Figure 1:
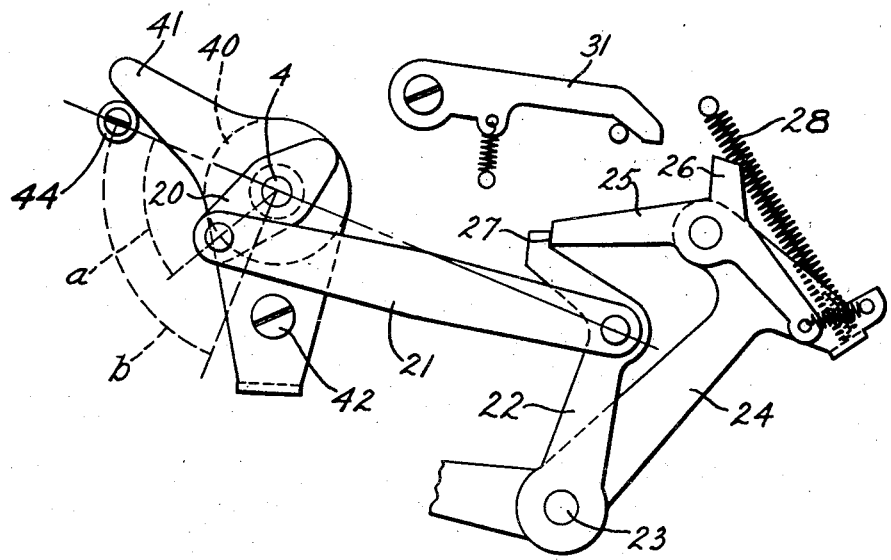
Fig. 1 is an elevation of full cycle locating mechanism constructed in accordance with the invention.
Figure 2:
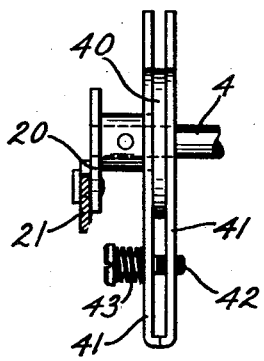
Fig. 2 is a detail edge view of certain parts shown in Fig. 1.

Patent 1,544,806 shows full cycle mechanism applied to a calculating machine, and the present invention is intended to be applied to calculating or other machines equipped with motor driving means and a clutch, as illustrated, for instance, in Patent 1,566,650, issued to George C. Chase on December 22, 1925. Obviously any other clutch device might be used.

The numeral 4 represents a driven shaft of the mechanism to be located, this shaft being provided with a crank arm 20, having link connection 21 with a rock arm 22, so that, during the rotation of shaft 4, in either direction, arm 22 will rock about its pivot point 23. A second rock arm 24 is pivoted at point 23, and carries thereon a spring pawl 25, said pawl during the operation of the machine being held in restrained position by the action of spring 28 of the arm 24 causing contact of lug 26 of said pawl with an end of a trigger 31. Upon tripping of trigger 31, pawl 25 will fall upon a shoulder 27 of rock arm 22, and after the connection 20, 21 moves through dead center position, shoulder 27 will be moved past the end of pawl 25, allowing the pawl to drop into engagement behind said shoulder. Shaft 4 continuing to rotate, pawl 25 will act as a coupling between arm 22 and 24, so that arm 24 will be carried with arm 22, tensioning spring 28. Either before or after engagement of the pawl 25 with shoulder 27, the clutch between the motor and the shaft 4 may be released, whereupon spring 28 will counteract the momentum of the parts, and will thereafter swing them backward toward the dead center position, which position is assumed to be the normal or full cycle position of the parts. Obviously, the parts will not stop in this full cycle position, but will sweep through to the other side of dead center, unless additional locating mechanism is provided. It is also obvious that this mechanism will act equally to locate the parts whether shaft 4 is rotated in one or in the other direction.

According to the present invention, a friction device is associated with the locating members above-described. This device consists of a disk 40, fast upon shaft 4, and of two resilient plates 41, 41, embracing disk 40, and held in contact therewith by means of a screw 42 and spring 43. The plates 41 are formed with radial arms, providing opposed contact faces for cooperation with a fixed stop 44.

The arms are so spaced that after contact of one of said arms with the stop 44 and upon reversal of shaft 4 considerable movement will be allowed to the friction plates 41 before the opposed arm thereof contacts with the stop 44. This will relieve shaft 4 and the mechanism connected therewith of the frictional drag of the plates 41 during this limited reverse movement, whereupon the friction will again be effective. The degree of free movement of the plates 41, from one stopping position to another, is intended to have a definite relation to the degree of movement allowed arm 24 during the locating action, the latter being determined either by the strength of spring 28 or by contact of arm 24 with any desired form of stopping device. For instance, it may be desired that the reaction of spring 28 shall carry the parts a certain distance beyond the exact full cycle position, so that various adjustments of the mechanism may be effected. As one example of such adjustment, it will be noted that when the parts pass through the full cycle position on the reactive movement of spring 28, lug 26 of pawl 25 will contact with the end of trigger 31, and the arresting means will be automatically restored to normal position, wherein the machine may be freely operated. In Fig. 1 it has been assumed that at the position illustrated, spring 28 will have fully checked the momentum of the rotating parts, and it will be observed that the pivotal connection of parts 20, 21 have swung through the arc *a* from their full cycle position. The line *b* indicates that the plates 42 may move reversely through a greater arc than the arc *a*, so that the parts will be returned to and through full cycle position before the frictional drag is again encountered. Upon the return movement, under the influence of spring 28 the parts will have but slight momentum, so that, when the friction load is again encountered, they will be brought rapidly to rest.

The screw 42 may be adjusted to secure any desired degree of friction between disk 40 and plates 41, and it is to be observed that adjustment of this screw will be equivalent to an adjustment of spring 28, since if there is a considerable frictional drag, said spring will be correspondingly effective in overcoming the momentum of the parts. The invention has the advantage, over the prior art locating devices of the notched disk type, that the resistance encountered by the driving mechanism, during multi-cycle operation, is evenly distributed, or constant, rather than intermittent, so that noise and vibration are eliminated.

I claim:

1. In a full cycle locating mechanism, the combination with a driven shaft and spring checking means engageable with said shaft, of a device having frictional connection with said shaft and provided with spaced contact faces, and a stop adapted to engage either contact face and to allow a limited free movement of the device with the shaft upon reverse movement of said shaft by the spring checking means.

2. In a full cycle locating mechanism, the combination with a driven shaft, and spring checking means engageable with said shaft, of a device having frictional connection with said shaft and provided with spaced contact faces, a stop adapted to engage either contact face and to allow a limited free movement of the device with the shaft upon reverse movement of said shaft by the spring checking means, and means for adjusting the frictional tension of said device, to vary the effective action of the spring checking means.

3. In a full cycle locating mechanism, the combination with a reversible driven shaft, and spring checking means engageable with said shaft in either direction of rotation, of a device having frictional connection with said shaft and provided with spaced contact faces, and a stop adapted to engage either contact face and to allow a limited free movement of the device with the shaft upon reverse movement of said shaft by the spring checking means.

Signed at Orange, in the county of Essex and State of New Jersey this 1st day of December A. D. 1932.

EDWARD C. WALTER.